June 22, 1937.    J. H. HOWARD ET AL    2,084,441
METHOD FOR MAKING A CUTTING TOOL
Filed Jan. 9, 1934
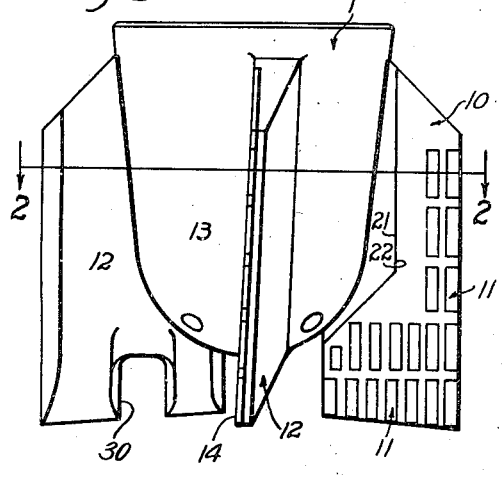
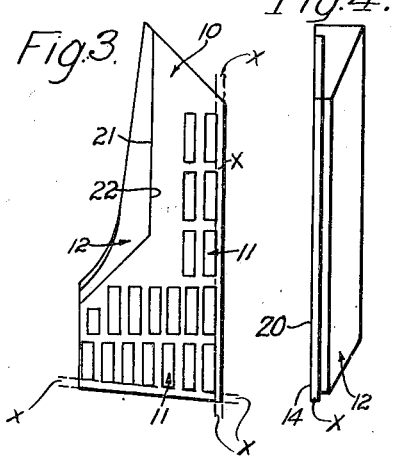
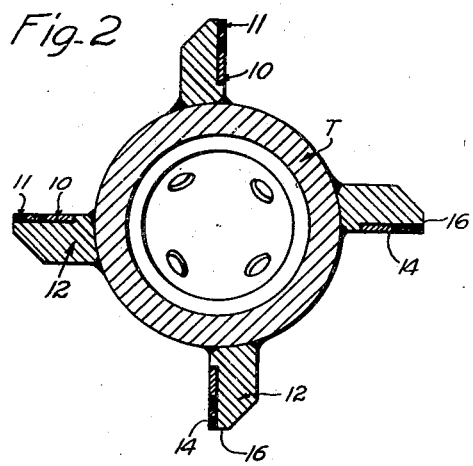
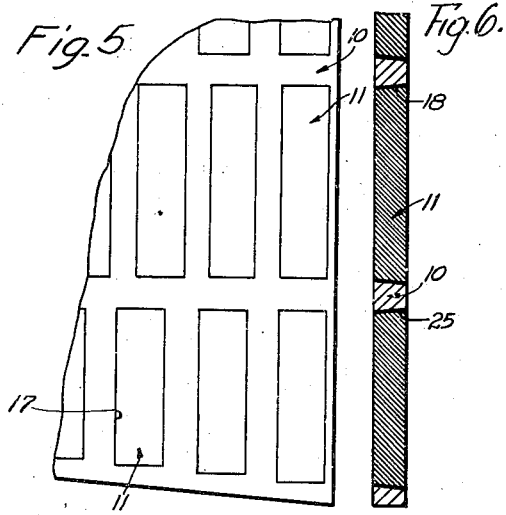
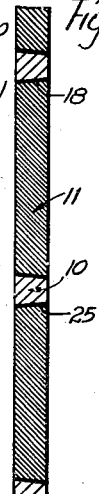
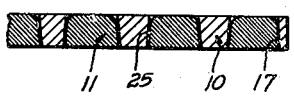
Inventors
John H. Howard
Alfred C. Catland
per
Attorney Patented June 22, 1937

2,084,441

UNITED STATES PATENT OFFICE 2,084,441

METHOD FOR MAKING A CUTTING TOOL

John H. Howard, Huntington Park, and Alfred C. Catland, Alhambra, Calif., assignors to Globe Oil Tools Company, Los Nietos, Calif., a corporation of California Application January 9, 1934, Serial No. 705,868

3 Claims. (Cl. 76—108)

This invention relates to a method for making a tool and relates more particularly to a method for making a cutting tool such as a well drilling tool. A general object of the invention is to provide a simple, practical and efficient method for making cutting or drilling tools.

The cutting parts of tools such as well drilling tools are often provided with inserts of hard cutting material, sometimes termed diamond substitutes. In the manufacture of well drilling tools these inserts have been welded in place. The welding operation subjects the inserts of hard cutting material to excessive and uneven temperatures, which often crack them, and the welding produces irregularities on the tool which must be ground off, the latter operation of grinding also endangering the inserts. Further, the welding of the inserts on the cutting part is expensive and does not insure the proper, accurate positioning of the inserts on the finished tool.

Another object of the invention is to provide a method for applying hard cutting inserts to a cutting tool or part without subjecting the inserts to excessive or uneven temperatures.

Another object of the invention is to provide a method for making a cutting or drililng tool that assures the accurate setting or placing of the inserts to provide for the efficient operation of the tool.

Another object of the invention is to provide a method for securely and dependably applying inserts of hard cutting material to a tool, without producing irregularities on the tool, whereby a minimum amount of grinding is required in the production of the tool.

Another object of the invention is to provide a method for making a cutting or drilling tool in which a multiplicity of bodies of hard cutting material and a protective plate are simultaneously attached or applied to a cutting part of the tool in a single operation.

A further object of the invention is to provide a method for making a cutting or drilling tool that includes the assembling of a plurality of bodies of hard cutting material on a plate in a manner to be securely held by the plate and to be definitely positioned with respect to one another, and the brazing together of the plate and the hard bodies, and the brazing of the hard bodies and the plate to the tool or cutting part, such brazing being accomplished in a single, simple, inexpensive operation.

A still further object of the invention is to provide a method of the character mentioned that may be readily and inexpensively carried out with typical, standard apparatus.

Other objects and features of the invention may become apparent from the following detailed description of a typical preferred manner of carrying out the method of the invention, throughout which description reference may be had to the accompanying drawing, in which:

Fig. 1 is a side elevation of a more or less typical well drilling bit made in accordance with the method of our invention. Fig. 2 is a horizontal detailed sectional view taken as indicated by line 2—2 on Fig. 1. Fig. 3 is a side elevation of a cutting blade with a plate thereon. Fig. 4 is an edge view of the assembly shown in Fig. 3. Fig. 5 is an enlarged fragmentary front elevation of the plate with the inserts arranged thereon. Fig. 6 is a vertical sectional view of the plate and insert assembly and Fig. 7 is a horizontal sectional view of the plate and insert assembly.

The method provided by our invention may be employed in the manufacture of tools of various characters, for example it may be advantageously employed in the making of well drilling bits, well core drills and the like. Throughout the following detailed disclosure we will describe the invention carried out in connection with the making of a rotary well drilling bit, it being understood that the invention is not to be construed as limited or restricted to the specific details or application about to be described, but is to be taken as including any features or modifications that may fall within the scope of the claims.

The method of the present invention includes, generally, providing a plate 10 and a plurality of bodies 11 of hard cutting material, assembling the bodies 11 on the plate, positioning and clamping the plate 10 on the cutting part 12 of a tool T, and the bonding together of the plate 10 and the bodies 11, and the bonding of the plate and bodies to the cutting part 12.

The plate 10 forms the support or carrier for the bodies 11 of hard cutting material during the carrying out of the method, and constitutes a facing on the cutting part 12 of the finished tool for protecting and holding the bodies 11. The plate 10 is shaped to properly fit on the face of the cutting part or tool. The plate 10 may be formed of various materials. When the drilling tool is to be used in certain earth formations it may be desirable to form the plate 10 of relatively hard material such as tool steel, while in other instances it may be desirable to employ a plate of softer material. The particular tool or well drilling bit T illustrated in the drawing has four cutting parts or blades 12, which are initially formed apart or separate from the body 13 of the tool. The blades 12 are substantially alike, however some of the blades 12 may have notches 30 in their lower ends. As the blades 12 are substantially alike, and each is provided with a plate 10 carrying inserts 11, we will proceed with a detailed description of the manner of providing one cutting part or blade 12 with a plate and the inserts 11, it being understood that such description may apply equally well to all of the several blades. The cutting part or blade 12 is of suitable thickness and its forward side or face 14 is flat and substantially vertical. The inner edge of the blade 12 is curved and formed to conform to the exterior of the tool body 13 so as to be readily connected with the body 13, as will be subsequently described.

The plate 10 may be shaped and proportioned to cover substantially the entire forward face 14 of the cutting part or blade 12. In the preferred manner of carrying out the invention the plate 10 is initially proportioned to project outwardly beyond the vertical outer edge 16 of the blade and downwardly beyond the lower end of the blade, as illustrated at X in Fig. 3 of the drawing. The inner edge of the plate 10 is spaced inwardly from the inner edge of the blade 12 to be clear of the tool body 13 for the purpose to be subsequently described. In preparing the plate 10 for use in the method of the invention it is provided with a plurality of openings 17 for receiving or holding the bodies 11 of hard cutting material. The number of openings 17 provided in the plate 10 depends upon the number of inserts or bodies 11 to be applied to the cutting part or blade 12. The openings 17 are located or positioned to provide for the arrangement of the bodies 11 of hard cutting material in the most advantageous places on the cutting part. In the particular case illustrated in the drawing there are two spaced rows of vertically spaced openings 17 extending along the outer edge portion of the plate 10, and two spaced rows of horizontally spaced openings 17 in the lower portion of the plate. The openings 17 are vertically elongated and are similar in shape. It is preferred to have the walls 18 of the openings 17 outwardly convergent. The openings 17 may be punched or otherwise cut in the plate 10. As described above, the plate 10 is proportioned to project beyond the edges of the cutting part or blade 12 when the plate is initially arranged on the blade, and the outermost openings 17 are spaced inwardly from the outer edges of the plate. In practice the outer walls of the rows of openings 17, adjacent the edges of the plate, may lie in substantially the same planes as the edges of the cutting part or blade 12, when the plate 10 is positioned on the blade. This positioning of the outer rows of openings 17 permits the outer bodies 11 of hard material to be securely held in position during the brazing or bonding operation and locates the bodies 11 at the edges of the finished blade 12.

In accordance with the broader aspects of the invention the inserts or hard cutting bodies 11 may be formed of any suitable or practical material and may be of any desirable shape. In well drilling tools it has been found practical to make the bodies 11 of tungsten carbide, or the like. The bodies 11 of hard cutting material are assembled or arranged in the openings in the plate 10 and are shaped and proportioned to fairly accurately fit the openings. Where the openings 17 in the plate 10 are substantially rectangular and elongated, as described above, the bodies 11 of hard cutting material are correspondingly shaped. The edges of the bodies 11 of hard cutting material are outwardly convergent and the inner and outer surfaces of the bodies 11 are flat and substantially flush with the surfaces of the plate 10. The cooperation of the convergent edges with the convergent walls of the openings 17 positively prevents the displacement of the bodies 11 from the openings when the plate 10 is in position on the cutting part or blade 12.

The step of assembling the multiplicity of inserts or bodies 11 of hard cutting material on the plate 10 is a simple act or operation comprising the assembling or inserting of the bodies 11 in the openings 17. If found desirable or if found practical the bodies 11 may accurately or closely fit the openings 17 so that they may be pressed into the proper positions in the openings and retained therein through engagement with the walls of the openings during the handling of the plate 10, etc. In practice it may be preferred to wrap the inserts or bodies 11 in copper foil or foil of other suitable brazing material and then press them into the openings 17. When wrapped in foil in this manner the foil is wedged or gripped between the bodies 11 and the walls 18 of the openings 17, causing the bodies 11 to bind in their proper positions in the openings. The copper or material of the foil serves as the brazing element or material for brazing the bodies 11 to the plate 10 when the plate 10 is brazed to the cutting part or blade 12. When all of the several inserts or bodies 11 of hard cutting material have been assembled in their respective openings 17, the plate 10 is ready for positioning or arrangement on the blade or cutting part 12.

In accordance with the invention the plate 10 carrying the multiplicity of bodies 11 of hard cutting material, is arranged on the face or front surface 17 of the cutting blade 12 and is clamped to the blade in preparation for the brazing step or operation. A sheet of copper foil or the foil or powder of other suitable brazing material is interposed or arranged between the opposing surfaces of the plate 10 and the blade 12. This layer or sheet 20 of brazing material may be such that the plate 10 may evenly and accurately fit on the front surface of the cutting blade 12. The bodies 11 of hard cutting material assembled in the openings 17 in the manner described above do not interfere with the proper arrangement of the plate 10 on the blade 12. It is preferred to have the inner surfaces of the bodies 11 even or flush with the inner surface of the plate 10, whereby the bodies 11 may be brazed to the cutting part or blade 12 during the brazing operation.

It is a feature of the invention that the plate 10 is definitely located or positioned on the blade 12 before being clamped and brazed to the blade. The invention contemplates various modes for definitely seating or locating the plate 10 on the blade. In the simple, preferred manner of carrying out the invention illustrated in the drawing, the inner edge 21 of the plate 10 is arranged against a shoulder 22 on the blade 12 to properly locate or position the plate on the blade. The shoulder 22 has a substantially vertical upper portion and a downwardly and inwardly inclined lower portion, and the inner edge 21 of the plate 10 is correspondingly formed to evenly seat against the shoulder. It will be apparent how the cooperation of the plate 10 with the shoulder 22 definitely and accurately positions the plate 10 on the forward side or face 14 of the blade 12.

The shoulder 22 also operates to space the plate 10 from the body 13 of the tool when the blade 12 is attached to the tool. Dowels, screws or other means may be utilized to locate the plate on the blade instead of providing the cooperating edge 21 and shoulder 22 for this purpose. Where the blade 12 is provided with the shoulder 22, the depth or width of the shoulder is preferably substantially equal to the thickness of the plate 10, so that the outer surface of the plate will be substantially flush with the raised portion of the blade 12 when the plate is in position on the blade. In clamping the plate 10 on the blade 12 any of the well known forms of clamps or clamping devices may be employed. As the various typical clamping devices are well known to those skilled in the art, the means for clamping the plate 10 to the plate 12 preparatory to and during the brazing operation have not been illustrated. When the plate 10 is securely and evenly clamped to the face 10 of the blade 12, the inner surfaces of the bodies 11 are likewise clamped to the blade and the taper or outward convergence of the edges of the bodies 11 and the walls of the openings 17 causes the bodies to be tightly wedged or clamped in position in the openings 17.

The next step or operation of the method is the act of brazing together the bodies 11 and the plate 10, and the plate 10 and the blade 12. The cutting part or blade 12, with the plate 10 clamped to it, is placed in a suitable furnace to be subjected to the brazing temperature or a temperature above the melting point of the copper or other brazing medium used. The clamped together assembly is thoroughly and evenly heated through to the required temperature. It is a feature of the invention that the parts to be brazed together are heated to the brazing temperature in an atmosphere of hydrogen or other gas which excludes the air, and eliminates scale, oxides and other foreign matter from the surfaces of the parts without carburizing or decarburizing the parts to any appreciable extent. This process of brazing in a reducing atmosphere is sometimes termed "hydrogen welding". The layer or sheet 20 of foil or brazing powder between the opposing faces of the clamped together blade 12 and plate 10 forms the medium for bonding or brazing together the plate and blade, while the foil 25 wrapped about the bodies 11, when they are inserted in the openings 17, is the material for brazing the bodies 11 to the plate 10. When the bodies 11 of hard cutting material are made to closely fit the openings 17 without the use of the foil 25, a sheet of copper foil or a layer of suitable brazing powder may be provided on the outer surfaces of the plate 10 and the bodies 11 before the blade 12 with the plate 10 clamped to it is placed in the furnace.

During the brazing operation the clamped together blade and plate are brought to a temperature to cause the effective and complete brazing together of the plate and the blade, and the brazing of the hard cutting bodies 11 to the plate 10 and the blade 12. As the parts are brazed in a furnace the bodies 11 are subjected to even temperatures and, therefore, have little or no tendency to crack. The close accurate fit of the plate 10 on the blade 12, and the close fitting of the bodies 11 in the openings 17 causes the brazing medium or copper of the foil or powder to be drawn into any of the interstices that may exist between the parts by a capillary action. Capillary action causes the brazing medium to be drawn into and through the joints in all directions. The brazing medium in contact with the deoxidized surfaces alloys with the steel forming an alloy much stronger than the copper or brazing material, and may actually penetrate into the ferrous parts. The bonds thus produced are complete and have great strength. It is apparent that the layer of brazing powder or the sheet of foil 20 interposed between the opposing faces of the clamped together blade and plate effectively and fully bonds together the blade and plate while the foil 25 in the openings 17 or the foil or powder provided on the outer surface of the plate 10 bonds the bodies 11 of hard cutting material with the walls of the openings 17. The inner faces of the sides of the bodies 11 in being substantially flush with the inner side of the plate 10 are brazed directly to the forward face 14 of the blade 12 by the layer or sheet of brazing material 20.

After being heated to the brazing temperature to bring about the complete brazing together of the parts, the parts or assembly is permitted to cool in the atmosphere of hydrogen. When the cutting part or blade 12, with its plate 10, has cooled it may be removed from the furnace and the clamps or clamping devices employed to clamp together the plate and blade may be released or disconnected. If the material of the plate 10 is to be heat treated, this operation may be carried out after the brazing just described. The temperature to which the parts are brought during the heat treating of the blade 10 should not be high enough to injure the bonds between the parts. At any suitable time subsequent to the brazing operation the projecting edge portions X of the plate 10 may be removed or cut off to leave the outer rows of the bodies 11 at or adjacent the edges of the cutting part or blade 12. As described above, the outermost walls of the outer rows of the openings 17 may lie in the same planes as the outer edges of the blade 12, so that the removal of the projecting edge portions X of the plate 10 may leave the outermost sides or ends of the bodies 11 exposed at the edges of the plate 10 and blade 12. After the trimming or cutting off of the edge portions X of the plate 10 the cutting part or blade 12 may be attached to the body 13 of the tool T. In practice the cutting part or blade 12 may be welded to the tool body 13 as at 30. As the inner edge of the plate 11 is spaced inwardly from the edge of the blade the copper or material for brazing the plate to the blade does not interfere with the welding of the blade to the tool. It is believed that it will be apparent how the several cutting parts or blades 12 of the tool may be provided with the wear plates or face plates 10 and the inserts or bodies 11 of hard cutting material by the method described above, and suitably connected with or attached to the body 13 of the tool T.

The method of the present invention may be employed where the cutting parts or blades are initially rigidly connected with the body of the tool. In carrying out the method where the cutting parts are integral or rigid with the body of the tool, the plate 10 carrying the bodies 11 in their openings 17 are arranged or positioned on the forward faces of the cutting parts in the manner described above and are clamped to the cutting parts by suitable clamps or clamping devices. The brazing operation of the method is performed by placing the entire tool in a furnace and subjecting it to the brazing temperature in the presence of an atmosphere such as hydrogen or the like.

A tool made in accordance with the present method may be reconstructed or readily reconditioned for further use after becoming worn. When worn the tool may be returned to the shop and placed in an acid bath to eat away the copper or other brazing material so that the plates 10 are freed from the cutting parts or blades 12 and any remaining bodies 11 of hard cutting material are freed from the plates. Instead of placing the tool in an acid bath the tool may be subjected to a temperature sufficiently high to cause the plates 10 to be freed from their blades and to cause the remaining bodies 11 to be freed from the plates. The worn portions of the tool may then be rebuilt by welding or any other suitable method, and the cutting parts or blades 12 provided with new or replacement plates 10 carrying bodies 11 of hard cutting material. The method of the present invention may be employed in the applying of the replacement plates 10 to the reconstructed or rebuilt blades 12.

It is believed that the method of this invention is readily understandable from the foregoing detailed description. It is to be noted that the method may be easily and quickly carried out with typical or usual equipment and provides a tool in which the inserts or bodies of hard cutting material are undamaged and accurately positioned. The plates 10 form carriers for the bodies 11 during the carrying out of the method and constitute facings for the cutting parts or blades 12 of the finished tool and dependably support the bodies 11 against the thrusts to which they may be subjected during the cutting or drilling operations. The plates 10 each carry a multiplicity of the bodies 11 of hard cutting material so that a plate 10 and a multiplicity of bodies 11 are dependably brazed or bonded to a blade 12 in a single brazing operation. The inserts or bodies 11 of hard cutting material are not subjected to excessive or uneven temperatures and the cutting part requires little or no grinding after the plate 10 has been brazed in place. A tool manufactured in accordance with the method of the invention has its inserts or bodies of hard cutting material properly and accurately positioned on the cutting parts and does not have any irregularities or undesirable projections that are often caused by the welding on of inserts. The close or accurate fitting together of the parts prior to the brazing operation insures the complete bonding together of the plate 10, bodies 11 and blade 12.

Having described only a typical preferred application and manner of carrying out the method of the invention we do not wish to be limited or restricted to the specific details set forth but wish to reserve to ourselves any changes or variations that may appear to those skilled in the art or fall within the scope of the following claims.

Having described our invention, we claim:

1. The method of making a tool including wrapping bodies of hard cutting material with a foil of a brazing material, temporarily securing the wrapped bodies to a plate by tightly fitting them in spaced perforations in the plate, and then securing the plate and said bodies to the tool by brazing them thereon during which operation said foil forms a brazing bond between the said bodies and the plate.

2. The method of making a drilling or cutting tool comprising providing a plate having a tapered perforation, securing a tapered body of hard cutting material to the plate by wedging it in said perforation to have at least three of its surfaces bearing on the plate, and then attaching the plate and said body to the tool by brazing them thereto.

3. The method of manufacturing a tool including providing a plate having an opening, wrapping a body of hard cutting material with a foil of brazing material, temporarily securing the wrapped body to the plate by tightly fitting it in the opening, and then attaching the plate to the tool by brazing during which operation the foil forms a brazing bond between the said body and plate and between said body and the tool.

JOHN H. HOWARD.
ALFRED C. CATLAND.